SEMICONDUCTIVE DEVICES UTILIZING INJECTION OF CURRENT CARRIERS INTO SPACE CHARGE REGIONS
Original Filed July 15, 1957

INVENTORS
HERMANN STATZ
ROBERT A. PUCEL
BY Elmer J. Gorn
ATTORNEY

INVENTORS
HERMANN STATZ
ROBERT A. PUCEL
BY [signature]
ATTORNEY

June 29, 1965 H. STATZ ETAL 3,192,400

SEMICONDUCTIVE DEVICES UTILIZING INJECTION OF CURRENT CARRIERS INTO SPACE CHARGE REGIONS

Original Filed July 15, 1957 4 Sheets-Sheet 3

INVENTORS
HERMANN STATZ
ROBERT A. PUCEL
BY [signature]
ATTORNEY

INVENTORS
HERMANN STATZ
ROBERT A. PUCEL
BY H. Vincent Harsha
ATTORNEY 3,192,400

SEMICONDUCTIVE DEVICES UTILIZING INJECTION OF CURRENT CARRIERS INTO SPACE CHARGE REGIONS

Hermann Statz, Wayland, and Robert A. Pucel, Needham, Mass., assignors to Raytheon Company, Lexington, Mass., a corporation of Delaware Continuation of abandoned application Ser. No. 672,046, July 15, 1957. This application July 2, 1962, Ser. No. 208,177
6 Claims. (Cl. 307—88.5)

This is a continuation of our copending application, Serial No. 672,046, filed July 15, 1957, now abandoned.

This invention relates generally to electrical signal translation devices, and more particularly to devices of this type which comprise a body of semi-conductive material containing an impurity material or materials which alter the electrical conductivity characteristics of the semiconductive body.

Recent years have witnessed the discovery and development of a new type of electrical translation device comprising a body of semiconductive material, such as germanium or silicon, which is provided with adjacent zones or regions having different electrical conductivity characteristics. Each of the adjacent zones contains traces of impurity material from either the third or fifth groups of the Periodic Table according to Mendelyeev, which material gives rise to what is known as P-type conduction as in the case of the inclusion of an impurity material from the third group or N-type conduction to the instance of the inclusion of an impurity material selected from the fifth group. A zone is thus designated as a P or an N zone depending upon the predominance of the impurity material contained therein, and the interface between two opposite type zones is designated as a P–N (N–P) junction.

Devices of this type in which a single zone of one conductivity-type material, as for example, N-type, is positioned intermediate two zones of opposite conductivity-type material, such as P-type, are known in the art as P–N–P transistors. Conversely, devices in which the intermediate zone is P-type material and in which the two outer zones are N-type material, have been designated as N–P–N transistors. The two outer zones are, respectively, provided with conducting electrodes designated as emitter and collector, while the intermediate zone has an electrode designated as the base electrode in contact therewith. These devices, when provided with proper biasing voltages, are capable of performing amplifying, rectifying, and in some cases, oscillating functions, and have already found their place in audio frequency and relatively low radio frequency circuit applications. Substantially all these prior art devices depend for their operation upon the random diffusion motion of current carriers across the intermediate base region. However, since the time necessary for these current carriers to complete their transition across the base zone from emitter to collector is relatively long when compared to the frequency at which it is often desirable to provide operation, their use has been seriously restricted at the higher frequencies due primarily to the poor frequency response attainable in this region of the electromagnetic spectrum.

Accordingly, it is the primary object of the present invention to provide a new type of semiconductive device which differs markedly in structure from those of the prior art, and in which it is possible to obtain adequate frequency response characteristics even at frequencies ranging into the microwave region of the electromagnetic spectrum. Briefly, this highly desirable result is accomplished by providing a body of semiconductive material with a P–N junction, and a plurality of contacts to the body of semiconductive material which are positioned so as to be encompassed by, and included within, a space charge region which may be caused to exist in the vicinity of the P–N junction. The first of these contacts functions as means for injecting current carriers directly into the space charge region established in the body of the semiconductive material whereby the transit time of these carriers on their way to the collector is materially shortened as compared to the transit time of carriers through the base region of prior art transistors. The decreased transit time results from the accelerating force imparted to the current carriers by the strong electric field existing in the space charge region. A second of the above-mentioned contacts also lies within the confines of said space charge region, and functions to vary or modulate the emission of the current carriers by the emitting contact whereby the flow of said current carriers may be controlled by an externally applied signal voltage. In addition, the second or modulating contact functions to effectively reduce the influence of voltage changes across a load connected in the output circuit of the device on the emission of current carriers by the injecting contact leading to a device exhibiting a high output impedance. Thus, the device of the present invention is not restricted in practical application by feedback terms existing between output and input as occurs in presently known transistors.

It is important to note at this point that the devices of the present invention are not "transistors" as that designation has been heretofore used in the art. Since in devices in accordance with the present invention the means for injecting the current carriers into the semiconductive body is included in a space charge region extending from what would be the collector junction, transistor operation no longer occurs because emitter and collector are essentially short-circuited. Accordingly, because the present new devices intimately depend for their operation on the injection of current carriers substantially directly into a space charge region, and because in one described embodiment four external electrodes make contact with the semiconductive body, these devices will be hereafter designated generically as "spacistors," and more specifically in the case of the four electrode devices as "spacistor tetrodes."

The invention will be better understood as the following description proceeds, taken in conjunction with the accompanying drawings wherein.

Figures 1, 2, 3, 4, 5:
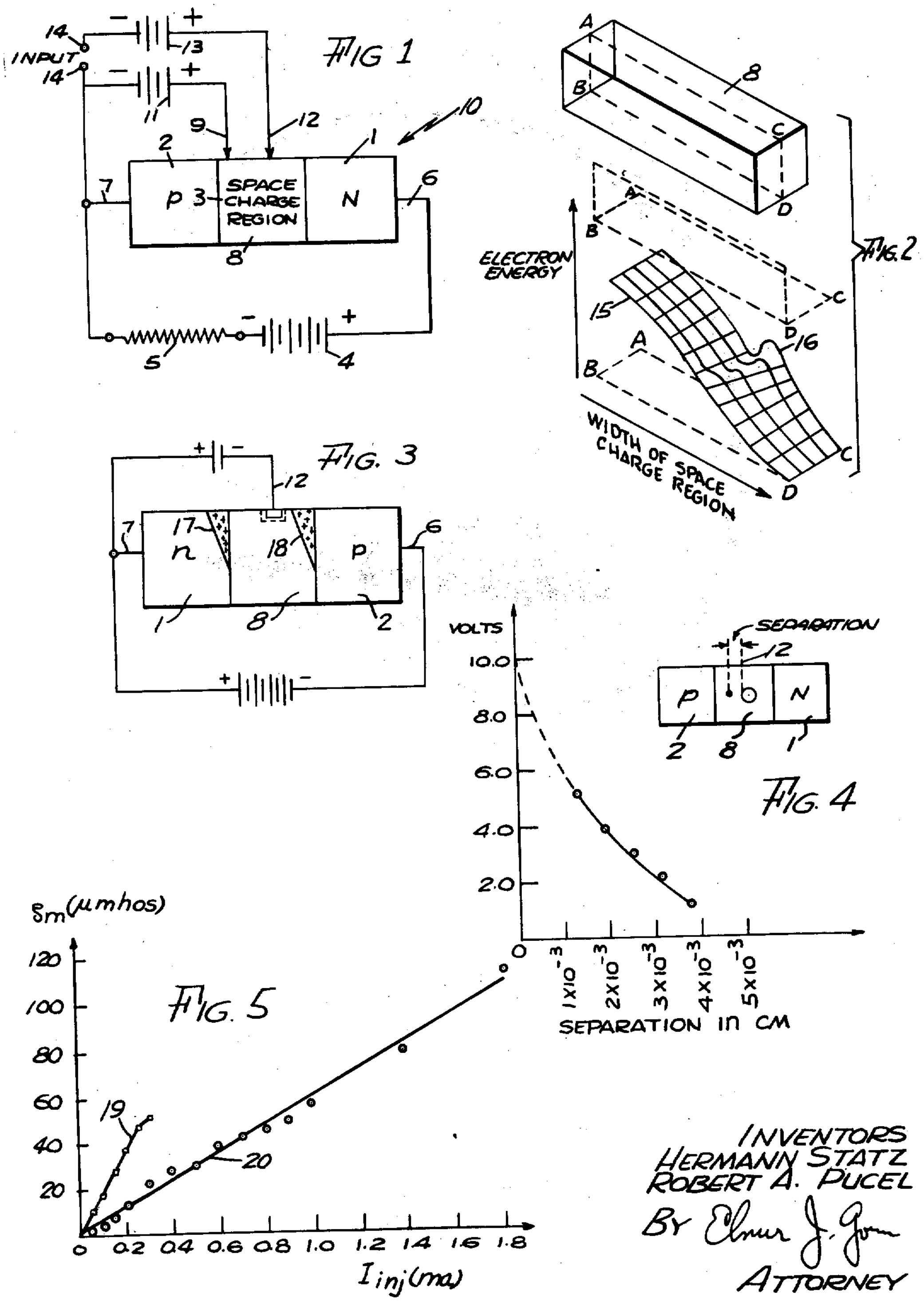
FIG. 1 is a schematic representation of one embodiment of a semiconductive spacistor in accordance with the present invention.
FIG. 2 is a diagram illustrating the potential existing in a longitudinal cross section through the space charge region in the device of FIG. 1 in the vicinity of the modulating point 12.
FIG. 3 is a diagram illustrating, in an exaggerated manner, the effect of a negatively biased contact in the space charge region of the device of FIG. 1.
FIG. 4 is a graph showing the variation of potential in the space charge region of the device of FIG. 1 as a function of the separation from the modulating contact.
FIG. 5 is a graph showing transconductance plotted versus injected current for two different devices of the present invention having different physical spacing between the injecting contact and the modulating contact.
Figure 6A:
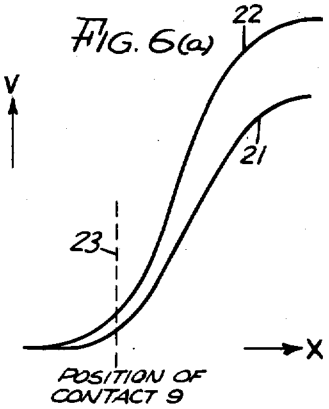
Figure 6B:
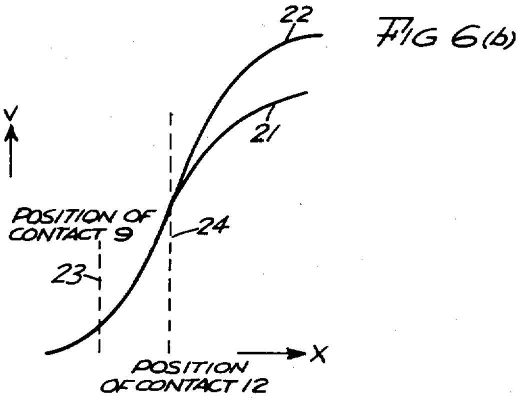
Figure 7A:
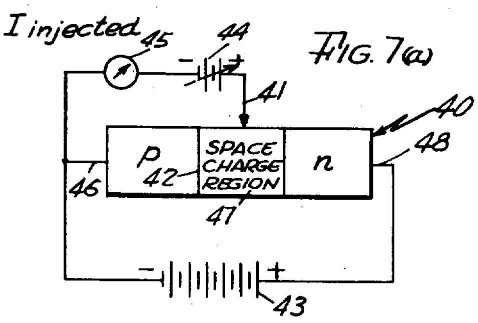
Figure 7B:
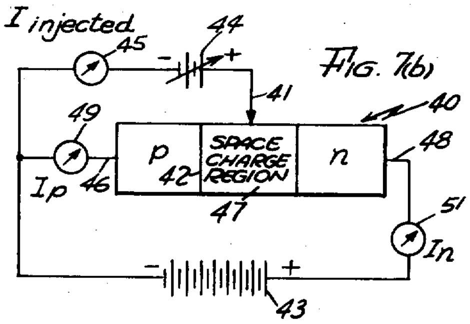
Figure 8A:
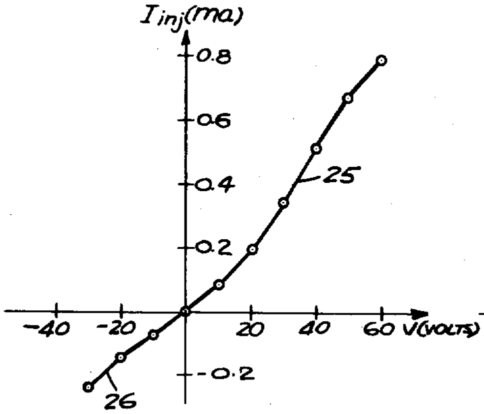
Figure 8B:
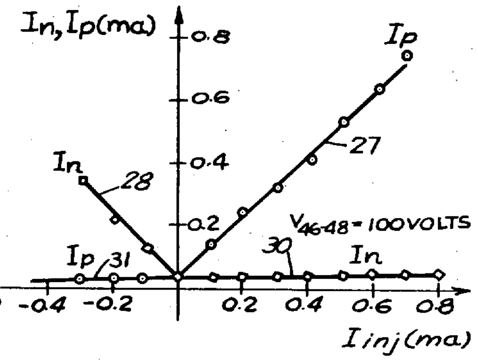
Figure 10A:
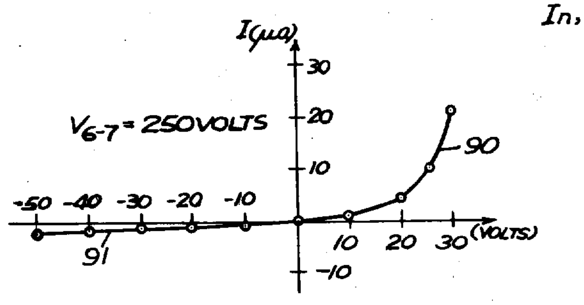
Figure 10B:
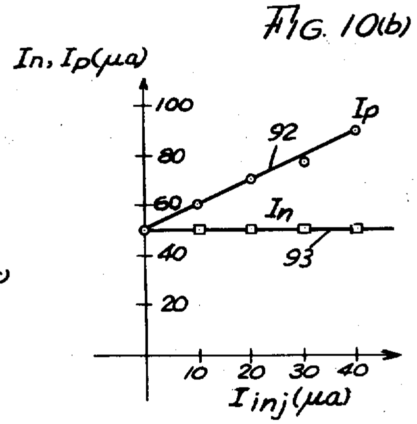
Figures 11A, 11B:
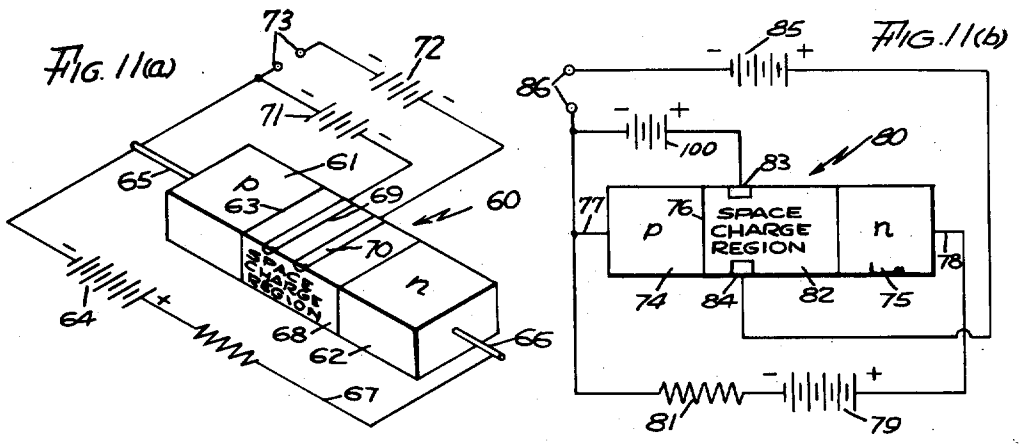
Figure 9:
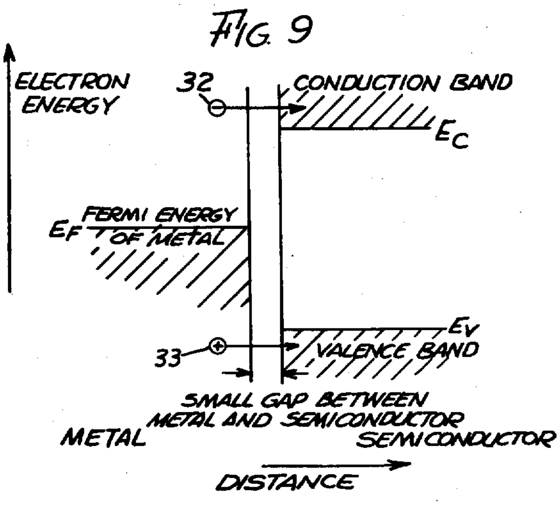
Figure 12:
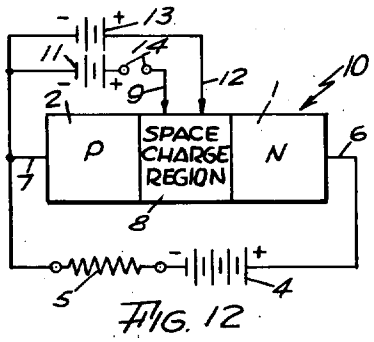

FIG. 6(*a*) is a diagram illustrating the potential existing across the space charge region of the device of FIG. 1 for two different values of applied biasing voltage between terminals 6 and 7, but without contacts 9 or 12 present;

FIG. 6(*b*) is a diagram illustrating the potential existing across the space charge region of the device of FIG. 1 for two different values of applied biasing voltage between terminals 6 and 7, with contact 12 present, and with contact 12 biased with a constant voltage with respect to terminal 7;

FIGS. 7(*a*) and 7(*b*) are circuit diagrams useful in measuring the current-voltage relationships, and injection efficiency of contacts located in space charge regions such as those of the device of FIG. 1;

FIG. 8(*a*) is a graph showing the relationship between injected current and voltage applied when the injecting contact of the device of FIG. 1 is a tungsten point;

FIG. 8(*b*) is a graph showing the proportion of "hole" and "electron" current flow for various values of total injected current when the injecting contact on the device of FIG. 1 is a tungsten point;

FIG. 9 is an energy level diagram useful in explaining the operation of the tungsten emitting contact on the device of FIG. 1;

FIGS. 10(*a*) and 10(*b*) are graphs similar to those shown in FIGS. 8(*a*) and 8(*b*) except that the injecting contact on the device is a heavily-doped P-type alloyed region;

FIG. 11(*a*) is a diagrammatic perspective view of an alternate embodiment of a device in accordance with the present invention;

FIG. 11(*b*) is a schematic representation of still another embodiment of a device in accordance with the present invention;

FIG. 12 is a circuit diagram of a device similar to that shown in FIG. 1 except that the input is shown as being between terminal 7 and injecting contact 9 rather than between terminal 7 and modulating contact 12 as shown in FIG. 1.

Figure 13:
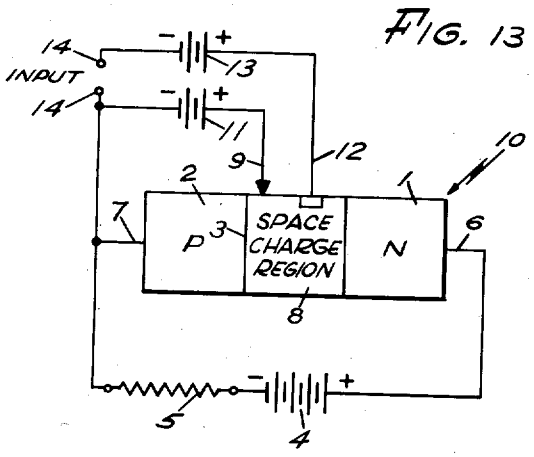

FIG. 13 is a schematic representation of another embodiment of a semiconductive spacistor in which the modulating contact is an alloyed contact.

Referring now to the drawings, and more particularly to FIG. 1 thereof, there is shown a schematic representation of a spacistor tetrode semiconductive structure embodying the present inventive concept. Numeral 10 designates generally a body of semiconducting material such as germanium or silicon, for example, which is provided with two adjacent regions 1 and 2 of opposite electrical conductivity type material. The body 10 may be made in any convenient manner well known in the art, as by growing the single crystal from a molten mass of semiconducting material, and alternately doping the melt with suitable impurity material in order to form N-type region 1 and P-type region 2, thereby forming the P-N junction 3 between the two regions.

The P-type region 2 is connected to the N-type region 1 through a source of biasing voltage, such as battery 4, and a suitable load resistor 5. As shown, the positive terminal of battery 4 is connected to an electrode 6 which is attached to region 1, and the negative terminal of battery 4 is connected to an electrode 7 which is attached to the region 2, thereby biasing junction 3 in the so-called reverse direction and creating space charge region 8 extending into the N-type region 1, and into the P-type region 2. The body 10 has a current carrier injecting contact 9 connected to the surface thereof adjacent to the junction 3, and positioned so as to be included within the space charge region 8. The injecting contact 9 is connected to the terminal 7 through a battery 11 which biases the contact 9 negatively with respect to the potential of the underlying space charge region. It should be understood, however, that the potential of the contact 9 is still positive with respect to the terminal 7. Under this condition, current carriers, in this case electrons, will be injected into the space charge region, flow through N region 1, battery 4, resistor 5, battery 11, and back to contact 9. The emission of the electrons from contact 9 will be space-charge-limited in most cases to be herein described. In the example being described, the contact 9 may be a small strongly N-type doped region, or alternatively, may be a pressure contact with a sharp tungsten point in contact with the surface of body 10. In any event, contact 9 must be of a type which will inject current carriers under the bias conditions set forth.

As shown in FIG. 1, the body 10 is also provided with a second contact 12 located adjacent to the injecting contact 9. The contact 12 may be termed a modulating contact, and is also included within the confines of the space charge region 8. A battery 13 has its positive terminal connected to the modulating contact 12, while the negative terminal of battery 13 is connected to one side of a pair of input terminals 14. Under this condition of bias, the contact 12 will be biased in reverse with respect to the potential of the underlying space charge region 8, i.e., the contact 12 will be negative with respect to this potential. This fulfills the essential condition that the contact 12 be rectifying when situated in the space charge region 8, i.e., the reverse current flow through contact 12 will be substantially nil, whereas forward current flow into body 10 will be large. The modulating contact 12 may be a heavily doped small P-type region, for example, in order to meet this condition.

In operation of the device, the bias potential provided by battery 13 to modulating contact 12 will always be positive with respect to the injecting contact 9. In spite of this fact, none of the current carriers emitted by contact 9 will be collected by the contact 12. The reason for this action may be partially seen by reference to FIG. 2 wherein there is shown a schematic representation of the potential in terms of electron energy in a longitudinal cross-section of the space charge region 8 of the device shown in FIG. 1. The mesh-like section 15 represents the electron energy in the space charge region, and the injected electrons will flow down the inclined portion toward the line CD representing the end of the space charge region. As can be seen, the field is deformed in the vicinity of the biased point 12 and forms the raised area 16 which gradually decreases in height outwardly toward the front portion of the field 15. There is thus effectively created a region of higher negative potential in the area immediately under the contact 12 which causes the emitted electrons to flow around this area on their way to the line CD. Thus, by biasing point 12 negatively with respect to the potential of the underlying space charge region, no net electron current will flow into the contact 12. Since the contact 12 is placed in a space charge region, the field produced by it will penetrate and alter the total field throughout the space charge region 8. The field extends to the boundaries of the space charge region where it is shielded out by a deformation of the old space charge boundary to form the new space charge boundaries 17 and 18, as is shown in FIG. 3. In FIG. 3, the injecting contact 9 has been omitted and only the modulating contact 12 is shown in order to more clearly illustrate the effect of the biased contact 12 on the space charge region 8. The manner in which the potential in the space charge region 8 is altered by the presence of a biased modulating point 12 may be easily measured. For this purpose, a 10 volt alternating voltage was superimposed on the bias of contact 12 and with the tungsten injecting-contact 9 floating, the A.C. voltage on the surface of the space charge region was measured at various points. In FIG. 4, the results are shown for a germanium device having a graded P-N junction with a total applied direct voltage of 220 volts across a $1.2 \times 10^{-2}$ cm. wide space charge region. In FIG. 4, the separation shown on the schematic figure above the graph and on the graph itself is the physical distance between the various points of measurement and the modulating contact 12.

As previously pointed out, the modulating contact 12 performs a two-fold function. First, by superimposing an alternating current voltage on the D.C. bias, emission of current carriers being injected by the contact 9 may be controllably varied. This is so because the field strength in the vicinity of the injecting point 9 will be altered, and the space charge limited emission will be modulated. The degree of modulation has been found to depend critically on the geometric arrangement of the contacts 9 and 12, particularly on their physical spacing, and also on the magnitude of the bias current flowing. To discuss the modulation quantitatively, it is convenient to use vacuum tube terminology and define a transconductance $g_m$ as $$g_m=\frac{\partial I_{out}}{\partial V_{mod}}=\frac{\partial I_{inj}}{\partial V_{mod}} \quad (1)$$

In equation 1 $I_{out}$ is the load current and $I_{inj}$ the injected current, while $V_{mod}$ is the potential of the modulating contact 12. The transconductance $g_m$ is plotted in FIG. 5 for two typical germanium devices as a function of the injected bias current, the curve 19 representing a unit in which the contacts 9 and 12 were closer together than the same contacts in the unit represented by curve 20. From these curves, it can be seen that $g_m$ increases approximately linearly with the injected bias current. In units under test, the modulating contact was a P-type gold alloyed dot approximately $5\times10^{-3}$ cm. in diameter, while the injecting contact 9 was a tungsten point approximately $1.2\times10^{-3}$ cm. away from the edge of the modulating contact 12. The reason for the different slopes of the curves 19 and 20 is related to the fact that the separation between the injecting contact 9 and the modulating contact 12 was not exactly the same in both devices, the spacing between said contacts in the device of curve 19 being slightly less than the spacing between the contacts of the device of curve 20. In testing the above devices, a total voltage of 205 volts was applied, and the width of the space charge region was approximately $10^{-2}$ cm. It should be clearly understood that the positions of the injecting point and the modulating point preferably are in alignment in a direction longitudinal to the direction of the space charge region since, if these contacts sit side by side laterally of the space charge region, a lower $g_m$ has been found to exist for comparable distances of separation.

The second function of the modulating contact 12 is to reduce the influence of voltage changes across the load 5 on the emission of current carriers by the injecting contact 9. To aid in illustrating how this function is performed by contact 12, reference should now be made to FIGS. 6(*a*) and 6(*b*). In FIG. 6(*a*), the potential across a space charge region without any contacts made to the space charge region is shown for two different applied voltages between terminals 6 and 7 of a device such as shown in FIG. 1, and are represented by the curves 21 and 22. The position which an injecting contact would usually occupy is indicated by the dotted line 23. It can be clearly seen that variation of the applied voltage will vary the potential of the space charge region underlying the injecting contact, and thus affect the emission of current carriers by the injecting contact, or in other words the potential bias with respect to the underlying space charge region of the injecting contact depends upon the applied voltage. Contrast this situation with that shown in FIG. 6(*b*) wherein the potential across the space charge region near the surface is shown for the same two applied voltages as in FIG. 6(*a*), curves 21 and 22, but with a modulating contact present, positioned as indicated by the dotted line 24, and biased with a constant voltage with respect to the terminal 7 of FIG. 1. In FIG. 6(*b*) it can be seen that the lower portions of the curves 21 and 22 now essentially coincide in the region where the injecting contact is positioned so that there is substantially no variation in the potential of the underlying space charge region with change in applied voltage. Consequently, the bias of the injecting contact with respect to the space charge region will be substantially independent of the voltage applied across terminals 6 and 7 of the device of FIG. 1. This, in turn, results in the current emitted by injecting contact 9 being substantially independent of the applied voltage, thereby providing a high output impedance for the semiconductive device. This output impedance has been found to be as high as 30 megohms for $I_{inj}=0.3$ ma. in the unit for which $g_m$ values are shown as curve 19 in FIG. 5.

In order to obtain maximum operating efficiency of devices in accordance with the present invention, it is necessary that the contact 9 have good current-injecting characteristics, and that the modulating contact 12 have good rectifying properties in the space charge region 8. In order that the device of FIG. 1 exhibit a high power gain, it is particularly important that the modulating contact 12 have a good reverse characteristic.

As previously described, the injecting contact 9 of the spacistor of FIG. 1 may be a tungsten wire making pressure-point contact with the surface of the semiconductive body 10. The current-voltage relationship of such a contact may be measured by utilizing the test circuit shown in FIG. 7(*a*). As there shown, a semiconductive body 40 having P and N regions similar to the body of FIG. 1, is provided with a tungsten injecting contact 41 similar to the contact 9 in FIG. 1. The P-N junction 42 is reversed biased by battery 43. A variable voltage source 44, and a current reading meter 45 are connected between the contact 41 and terminal 46. No current will flow when the potential of contact 41 substantially equals the potential in the underlying space charge region 47. In testing, the voltage applied to contact 41 by battery 44 is measured relative to the above-mentioned potential so that for $I=0$, $V=0$. The amount of current injection may then be varied by variation of the voltage applied to contact 41.

In FIG. 7(*b*), there is shown an additional test circuit similar to the circuit of FIG. 7(a) except for the addition of current reading meter 49 connected between terminal 46 and meter 45, and current reading meter 51 connected between terminal 48 and battery 43. This circuit enables a determination to be made of what fraction of the injected current consists of electrons read by meter 51, and what fraction of the injected current consists of "holes" as read by meter 49.

Referring now to FIG. 8(*a*), the current-voltage characteristic of a typical tungsten contact in the space charge region is shown as obtained by utilization of the test circuit of FIG. 7(*a*). As shown, the curve 25, representing the forwardly biased impedance characteristic of contact 41, i.e., when contact 41 is made increasingly positive with respect to the underlying space charge region, is substantially the same as the reverse bias impedance curve 26, i.e., when contact 41 is made increasingly negative with respect to the underlying space charge region. The curves 25 and 26 thus indicate that practically no rectification takes place regardless of the polarity of the voltage applied to injecting contact 41. This surprising result is radically different from that found for tungsten point contacts made to neutral N or P-type semiconductive material, i.e., semiconductive material in which no space charge exists under the point. As a result, applicant has discovered that a tungsten point is effectively biased in the "forward" direction when the point is either positive or negative relative with respect to the underlying space charge region, and has thus been enabled to utilize such a contact as an emitter of current carriers regardless of which polarity the contact assumes.

In FIG. 8(*b*), the "hole" and electron currents, $I_p$ and $I_n$, respectively, are plotted as a function of $I_{inj}$. It can be seen that for voltages, which bias the contact 41 positively with respect to the underlying space charge region 47, the injected current consists mainly of holes as shown by curve 27. In the space charge region, these holes flow to the P region, and this hole current is recorded by the meter 49 in FIG. 7(*b*). For the opposite polarity, the injected current consists mainly of electrons, shown by curve 28, which flow to the N region, and the resultant electron current is recorded by the meter 51 in FIG. 7(*b*). The graph of FIG. 8(*b*) also shows that there are small changes in $I_n$ with changes in $I_{inj}$ when mostly hole current flows, as seen by curve 30, and small changes in $I_p$ with changes in $I_{inj}$ when mostly electron current flows, as shown by curve 31. The decrease of $I_p$ with $I_{inj}$ to the left of the origin is what would normally be expected. Some of the holes generated in the space charge region 47, or in the N region within approximately one diffusion length of the space charge region are collected while flowing by the tungsten contact 41. Thus, $I_p$ is expected to decrease the more negatively the contact 41 is made with respect to the space charge region. By the same reasoning, however, it would also be expected that $I_n$ would decrease with increasing $I_{inj}$ to the right of the origin, contrary to the observed results. Although this phenomena is not at present completely understood, several reasons may be hypothesized to account for this observation. For example, because of injection the PN junction may become heated sufficiently enough to increase the reverse current of the main diode; or the field strength may be large enough so that some of the injected current carriers induce avalanche multiplication; or, small leakage currents across the surface of the semiconductive body may account for the observed effects.

It should be understood that although action of the current injecting point contacts 9 and 41 have been described with respect to tungsten, these contacts are not limited to the use of tungsten since any metallic contact may be substituted therefor and still function as an injector of either "holes" or electrons depending on the polarity of the contact with respect to an underlying space charge region as previously described. Although the reasons for the extraordinary performance of such a contact are not fully comprehended at the present time, a reference to FIG. 9 and the following description presents at least one plausible explanation.

In FIG. 9, the metal is shown substantially in contact with the semiconductor. Surface charges have been ignored since if they are not large enough to cause inversion layers, they will not affect the argument. In the semiconductor there are virtually no holes in the valence band and no electrons in the conduction band, because the high field in the space charge region sweeps out all carriers. Electrons from the metal will flow into the conduction band of the semiconductor as depicted by the arrow leading away from the encircled negative sign 32. The magnitude of this current will be $$I_n = I_{no} \exp \frac{-(E_c - E_F)}{kT} \qquad (2)$$

In Equation 2 $I_{no}$ is a constant which is related to the area of the contact, the probability of transition for an electron from the metal to the conduction band in the semiconductor, and other factors. The Boltzmann factor in Equation 2 takes into account the number of electrons that have enough thermal energy to make the transition into the semiconductor. The quantity $E_c$ is the energy of the conduction band edge of the surface and $E_F$ is the Fermi energy in the metal, $k$ is Boltzmann's constant and T the absolute temperature. Similarly, electrons will make transitions from the valence band of the semiconductor into the metal or, what is the same, holes will go from the metal into the valence band of the semiconductor as indicated by the encircled plus sign 33 with the arrow indicating direction of travel. The hole current $I_p$ will be of the form $$I_p = I_{po} \exp \frac{-(E_F - E_v)}{kT} \qquad (3)$$

The quantity $I_{po}$ is related to the area of the contact and to the probability of transition of a hole from the metal into the semiconductor. The eneregy of the valence band edge at the surface is denoted by $E_v$. Thus the net current I out of the contact into the semiconductor is $$I = I_p - I_n = I_{po} \exp \frac{-(E_F - E_v)}{kT} - I_{no} \exp \frac{-(E_c - E_F)}{kT} \qquad (4)$$

If the contact is floating, $E_F$ will take on a value $E_{Fo}$, for which $I=0$. From Equation 4

$$\exp \frac{E_{Fo}}{kT} = \sqrt{\frac{I_{po}}{I_{no}}} \exp \frac{E_c + E_v}{2kT} \qquad (5)$$

If a voltage V is applied between the metal and the semiconductor, most of the potential drop will occur in the space charge region; however, because of the finite spacing between the metal and the surface, a small fraction of the voltage will appear between the metal and the surface. Let this fraction be $c$. Thus for an applied voltage V, the Fermi energy of the metal will shift with respect to the energy bands at the surface from $E_{Fo}$ to $$E_F = E_{Fo} - qcV \qquad (6)$$

where, $q$ is the charge of an electron. Inserting Equations 5 and 6 into 4 gives $$I = 2\sqrt{I_{no} I_{po}} \exp \frac{E_V - E_c}{2kT} \sinh \left(\frac{qcV}{kT}\right) \qquad (7)$$

The experimental curves exhibit the main features of Equation 7. However, it must be considered that the validity of Equation 7 is limited to small currents and voltages. As the current increases, the concentration of electrons or holes in front of the contact increases. As a result, the assumptions of negligible concentrations of electrons or holes in the semiconductor break down. Also, these electrons or holes reduce the electric field near the point and $c$ decreases, or in other words, the space charge starts to limit the emission from the point. Thus, there is a transition from the current-voltage relationship of Equation 7 to one corresponding to space charge limited emission. For completeness, one may mention one other reason for $c$ to be a slowly verying function of the applied voltage. For large enough applied voltages, the boundaries of the space charge region are deformed, causing a change in the fraction of the applied voltage that appears between the metal and the semiconductor surface. However, the above derivation shows why there is no rectification for a metallic point in a space charge region, and why for positive and negative biases, holes and electrons are injected, respectively.

We now turn our attention to the type of contact which may be utilized as the modulating contact 12 of the device shown in FIG. 1. As has been heretofore stated, it is essential to the successful operation of the device of FIG. 1 that the modulating contact exhibit a substantially rectifying characteristic in the space charge region 8. It has been found that a heavily doped P-type contact, made, for example, by alloying a small quantity of P-type impurity material to the semiconductive body 10, provides a contact which fulfills the required condition. Such an embodiment is shown in FIG. 13 in which the reference numerals are identical to those shown in FIG. 1, except that the modulating contact 12 in FIG. 13 is shown as an alloyed contact, which may be P-type, while injecting contact 9 is a point or pressure contact. When such a contact is biased in reverse, as by battery 13, the contact 12 will draw essentially no current. This may be seen as follows: Since the contact 12 is biased negatively with respect to the underlying space charge region 8, the holes in the small P-type contact cannot flow into the space charge region. However, there are some electrons in the P-type contact. Their concentration will be zero at the boundary between the P-type contact and the space charge region. There will thus be a concentration gradient in the electron distribution from the inside of the P-type contact or region to the boundary between this contact and the space charge region, thereby giving rise to an exceedingly small direct current. The magnitude of this current may be of the order of $10^{-7}$ amps. for germanium, and will be many orders of magnitude less for silicon. This current will not depend on the voltage bias applied by battery 13 as long as this bias is larger than a few tenths of a volt, and thus, the output differential impedance will be infinite. No electrons can flow in the P-type contact region 12 from the space charge region 8 because of the reverse bias supplied by battery 13. The P-type contact, however, in principle collect some holes which have been thermally generated in the space charge region 8 or in the neutral portion of N region 1 within approximately one diffussion length of the space charge region. The number of holes collected will depend slightly upon the reverse bias of battery 13, and thus, this contribution to the current flow will give rise to a finite differential input impedance. However, it has been found that input impedances on the order of 30 megohms can be achieved without difficulty, and improved methods of making the modulating contact and eliminating leakage current will in all probabiilty raise this figure to higher values.

Referring now to FIG. 11(*a*) there is shown a spacistor constituting another embodiment of the present inventive concept. Numeral 60 designates generally a body of semiconductive material, such as germanium or silicon, having a P-type region 61, and an N-type region 62, the interface between the two regions forming a P–N junction 63. The junction 63 is biased on the reverse direction by battery 64 having its negative terminal connected to terminal 65, and its positive terminal connected to terminal 66 through a load as resistor 67, thereby creating space charge region 68. The body 60 further has a current carrier injecting contact 69 made to the body 60 within the confines of the space charge region 68, and a modulating contact 70 also made to the body 60 within the space charge region. The injecting contact 69 is biased negatively with respect to the space charge region 68 by the battery 71, while the modulating contact 70 is biased negatively with respect to space charge region 68 by the battery 72. The embodiment shown in FIG. 11(*a*) differs from that disclosed in FIG. 1 in that the injecting contact 69, and the modulating contact 70 are line contacts to the body 10. It should be noted that in the interests of clarity, the contacts 69 and 70 are shown in greatly exaggerated fashion as far as width, depth of penetration, and spacing are concerned. In this embodiment, injecting contact 69 may be a heavily doped N-type contact formed by alloying an N-type or N-type alloy wire to a restricted depth into the body 10 thus forming a line contact N-type region, while the modulating contact 70 may be a heavily doped P-type contact formed by alloying a P-type or P-type alloy wire to a restricted depth into body 10 thus forming a line contact P-type region. The operation of this particular embodiment will be substantially the same as that described with respect to the embodiment of FIG. 1 when a modulating signal voltage is applied to the signal input terminals 73. The advantage of the structure shown in FIG. 11(*a*) resides primarily in the fact that larger values of $g_m$ may be obtained than with the use of spaced point contacts, and, additionally, the device may be operated at higher power levels than those in which the injecting and modulating contacts constitute essentially point contacts.

Referring now to FIG. 11(*b*) there is shown still another embodiment of the present invention. As before, a body of semiconductive material 80 has a P region 74, and an N region 75 separated by the junction 76. Biasing battery 79 has one side connected to terminal 77 through load 81, and its other side connected to terminal 78 to bias junction 76 in the reverse direction and establish space charge region 82. An injecting contact 83, for example, a heavily doped N-type region, is made to one surface of the body 10, and biased negatively with respect to the space charge region 82 by the battery 100. A modulating contact 84, for example, a heavily doped P-type region, is made to the opposite surface of the body 10 from that on which injecting contact 83 is positioned, and is also biased negatively with respect to space charge region 82 by the battery 85. In a manner similar to that described with respect to previous embodiments the emission of current carriers by contact 83 may be modulated by application of an external signal to input terminals 86. The advantage of positioning injecting contact 83, and modulating contact 84 on opposite surfaces of the body 10 again is due primarily to the larger values of $g_m$ attainable with this type of structure.

It should be clearly understood that the devices of the present invention are not limited to the mode of operation set forth in exemplary fashion with respect to the previously described embodiments, i.e., with the external modulating signal applied between the modulating contact and a fixed reference point. The devices may be operated in different ways, and still achieve the same results as previously described. Reference to FIG. 12 shows an example of one possible operating variation. The reference numerals of FIG. 1 are repeated in FIG. 12 since the structure and circuit arrangement of FIG. 12 is identical to that of FIG. 1 with the lone exception that the input terminals 14 of FIG. 1 are located between injecting contact 9 and terminal 7 rather than between modulating contact 12 and terminal 7 as shown in FIG. 1. This arrangement allows the external signal voltage to be applied to injecting contact 9 rather than modulating contact 12. With the input arrangement shown in FIG. 12, the spacistor exhibits a low impedance input and a high impedance output, as compared to the high input and output impedances obtained with previously-described embodiments.

Although the injecting contacts and modulating contacts in the spacistors previously described have been shown as either a metallic pressure point or as a heavily doped N-type region for the injecting contact, and as a heavily doped P-type region for the modulating contact, it should be understood that a P-type region could be used as an injecting contact, and an N-type region could be used as a modulating contact when the main P and N regions are reversed, and when the polarity of the biasing voltages are reversed. For example, in the spacistor of FIG. 11(*a*) the injector contact 69 could be P-type heavily doped contact, and the modulating contact 70 could be an N-type heavily doped contact. However, in this case, the positions of main P region 61, and main N region 62 would have to be interchanged, and polarities of the batteries 64, 71, and 72 would have to be reversed from that shown in FIG. 11(*a*).

FIGURES 10(*a*) and 10(*b*) show the charatceristics of current carrier injecting contacts which are impurity doped contacts rather than pressure point metallic contacts, the charatceristics of which were described in FIGS. 8(*a*) and 8(*b*) corresponding to FIGS. 10(*a*) and 10(*b*). As shown in FIG. 10(*a*), for a P-type doped contact, current is injected only when the contact is forward biased as represented by curve 90, and substantially no current is injected when the contact is reverse biased as shown by curve 91. Reference to FIG. 10(*b*) shows that when the doped contact is forward biased, the injected current consists almost entirely of holes, as shown by curve 92, while substantially no electrons are injected, as can be seen with reference to curve 93. No injected current is shown when the doped contact is reverse biased because of the very small current involved.

It should be further understood that although the devices of the present invention have been described primarily with reference to cases where germanium or silicon composed the body of semiconductive material, the devices are not limited to the use of only these two semiconducting materials. Any solid semiconducting material whose electrical conductivity characteristics are alterable by the inclusion of impurity atoms therein may be used. Examples of such semiconductive substances include silicon carbide; compounds of elements from Groups III and V of the Periodic Table according to Mendelyeev; and compounds from groups II and VI of the above-mentioned table. Indeed, since spacistor devices in accordance with the present invention operate independently of current carrier lifetime because there is no base region to traverse as there is in a transistor, many semiconducting materials which could not be utilized in the manufacture of transistors because of this problem may be successfully used to fabricate spacistors. Especially interesting in this connection are materials having very large energy gaps for high temperature operation.

Although there have been described what are considered to be preferred embodiments of the present invention, various adaptations and modifications thereof may be made without departing from the spirit and scope of the invention as defined in the appended claims. For example, although only two control contact electrodes have been shown included within the space charge region of the spacistor, it is obvious that additional contacts could be provided to exercise further control over the current carrier flow in the device, analagous, for instance, to the screen grid or suppressor grid in a vacuum tube.

What is claimed is:

1. An electrical translation device comprising a body of semiconductor material having a P–N junction therein, a biasing circuit connected across said junction and operable to establish a space charge region in the vicinity of said junction, injecting means in contact with said space charge region for injecting current carriers into said body, modulating means in contact with said space charge region adjacent said injecting means for modulating the flow of carriers through the space charge region, and load means in said biasing circuit.

2. In combination, a semiconductive device comprising a body of semiconductive material having regions of different electrical conductivity-type material, a biasing circuit connected across said regions for creating a space charge region in said body around and including a junction between said regions of different electrical conductivity-type material, load means in said biasing circuit, and a plurality of contacts to said body for generating and controlling current flow through said body, said contacts including at least one for injecting current carriers into said space charge region and at least one for modulating the carriers so injected, said contacts further being made to the body at said space charge region.

3. An electrical translation device comprising a body of semiconductor material having a P–N junction therein, a biasing circuit connected across the body for producing a space charge within at least a region of said body including said junction, said circuit comprising a source of electrical energy and load means electrically connected in circuit with said body, means in contact with said space charge region for injecting carriers into said space charge region and modulator means for varying the potential gradient in said space charge in the region of injection of said carriers by said first means into said space charge region.

4. In combination, a semiconductor device comprising a body of semiconductor material having a P–N junction therein, biasing means electrically connected in circuit with said body for creating a space charge region in said body at said junction and including load means, means for injecting carriers into said space charge region, said biasing means further including means connected to said body at a point remote from said space charge region for collecting said carriers after passage through at least a substantial portion of said space charge region, and modulator means in contact with said space charge region for varying the gradient of said space charge in the vicinity of said injecting means.

5. In combination, a body of semiconductor material having a junction therein separating P and N type regions, a biasing circuit including a source of baising potential coupled to said P and N regions for producing a space charge region in the vicinity of the junction and further including load means, first means positioned in contact with said space charge region for injecting carriers into said space charge region, second means positioned in contact with said space charge region for modulating the space charge region in the vicinity of said first means thus providing control of the flow of carriers between said means for injecting and one of said P and N type regions.

6. A combination in accordance with claim 5 wherein said load is coupled to both said source and to one of said P and N type regions of said body of semiconductor material.

References Cited by the Examiner

UNITED STATES PATENTS 2,932,748 4/60 Johnson ............ 307—88.5

JOHN W. HUCKERT, *Primary Examiner.*

ARTHUR GAUSS, *Examiner.*